United States Patent
Disano et al.

(10) Patent No.: US 6,447,630 B1
(45) Date of Patent: Sep. 10, 2002

(54) SECURITY THREAD AND METHOD AND APPARATUS FOR APPLYING SAME TO A SUBSTRATE

(75) Inventors: John Nicholas Disano, Ottawa; Nigel P. W. Walsh, Toronto; Tom D. Brett, Mississauga, all of (CA)

(73) Assignee: Agra Vadeko Inc., Ontario (CA)

( * ) Notice: Subject to any disclaimer, the term of this patent is extended or adjusted under 35 U.S.C. 154(b) by 0 days.

(21) Appl. No.: 09/439,471

(22) Filed: Nov. 15, 1999

(30) Foreign Application Priority Data

Nov. 20, 1998 (GB) ............................................. 9825364

(51) Int. Cl.[7] .............................. B44C 1/17; B44C 1/14; B32B 31/20; B41M 3/12; D21H 21/42
(52) U.S. Cl. ........................ 156/233; 156/230; 156/238; 156/240; 156/247; 156/289; 427/146; 427/147; 427/148; 427/162; 428/40.9; 428/41.8; 428/42.1; 428/209; 428/344; 428/915
(58) Field of Search ................................. 156/230, 233, 156/235, 238, 239, 240, 241, 247, 277, 289; 427/146, 147, 148, 162; 428/40.9, 41.8, 42.1, 42.3, 202, 208, 209, 344, 352, 914, 915

(56) References Cited

U.S. PATENT DOCUMENTS

| | | | |
|---|---|---|---|
| 3,235,395 A | * 2/1966 | Scharf | 428/344 |
| 4,386,135 A | 5/1983 | Campbell et al. | 428/447 |
| 4,557,960 A | * 12/1985 | Vernon et al. | 428/40 |
| 5,634,669 A | 6/1997 | Colgate, Jr. | 283/58 |
| 5,744,219 A | * 4/1998 | Tahara | 428/195 |
| 5,817,205 A | * 10/1998 | Kaule | 156/233 |
| 5,932,325 A | * 8/1999 | Ebihara et al. | 428/209 |

FOREIGN PATENT DOCUMENTS

| | | | |
|---|---|---|---|
| DE | 3744650 | 7/1989 | B44C/1/24 |
| EP | 0637618 | 2/1995 | C09J/7/02 |
| WO | 98/33648 | 8/1998 | B32B/31/12 |

* cited by examiner

Primary Examiner—J. A. Loreugo
(74) Attorney, Agent, or Firm—Connolly Bove Lodge & Hutz LLP

(57) ABSTRACT

Applied to a substrate such as paper banknotes is a thread which includes a PET carrier layer with release layers on both surfaces of the carrier layer, and a metallic layer outward of one release layer. An adhesive layer lies outward of the metallic layer. When a substrate is brought into contact with the adhesive layer, the result is to bond the metallic layer to the substrate. Following this, the PET carrier layer is peeled away, leaving the metallic layer bonded to the substrate. An apparatus for accomplishing these steps includes means for bringing the substrate into contact with the adhesive layer, and means for peeling the PET carrier layer away so that it separates from the metallic layer at the adjacent release layer.

5 Claims, 2 Drawing Sheets

SECURITY THREAD AND METHOD AND APPARATUS FOR APPLYING SAME TO A SUBSTRATE

Figure 1:
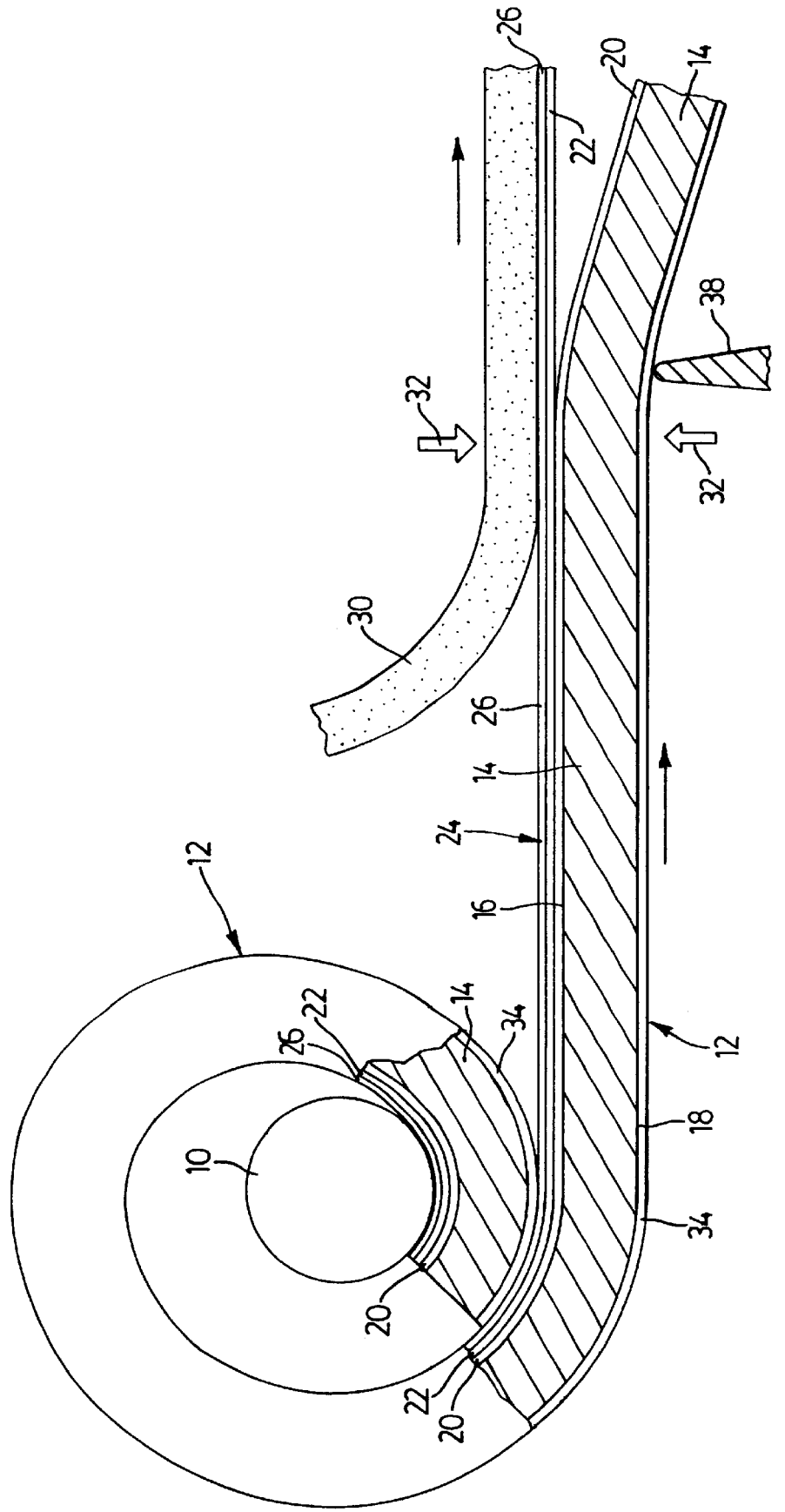

This invention relates generally to security devices incorporated into paper banknotes, in particular the use of a "thread" which is made part of the paper banknote.

BACKGROUND OF THIS INVENTION

Threads have been used as a security device in paper banknotes for some time. A typical conventional thread is composed of metallized PET (Polyethylene Terephthalate), i.e. a PET carrier layer supporting a metallic layer. The thread is typically either woven into the paper of the banknote, or hot foil stamped onto the banknote. In this specification, the word "substrate" will be used to refer to the web or other receiving sheet, including paper banknotes.

In one prior application where the thread is stamped onto the substrate under the application of heat and pressure, the PET carrier layer is stripped away from the metallized film after the thread has been applied. Alternatively, the PET carrier layer and the metallized film may, as a final step, be applied together to the substrate under the application of heat and pressure. In the first case the PET carrier layer is stripped away after the metallized film has been applied to the substrate, while in the second case it is not. The foregoing two alternatives have certain disadvantages. In the first, the heat sensitivity of the substrate may make it impossible to hot foil stamp the thread reliably. And in the second case, where the PET carrier layer and the metallic film are applied together to the substrate as a final step, the added thickness due to the PET carrier layer may cause web winding and sheet stacking problems if it is applied, for example, to a roll of paper or plastic film.

The present invention provides key improvements in the make-up of the thread, and to a standard thread application machine used previously to apply adhesive-coated threads to a substrate. With these improvements, the machine becomes capable of applying pressure-sensitive security threads onto a plastic or paper substrate, without the application of heat and without the PET carrier layer being applied.

GENERAL DESCRIPTION OF THIS INVENTION

Accordingly, this invention provides, for application to a substrate, a security thread comprising:
a carrier layer having opposed surfaces,
a first release layer on one of said surfaces,
a second release layer on the other of said surfaces,
a metallic layer outward of said first release layer, and
an adhesive layer outward of said metallic layer.

Further, this invention provides a method of securing a metallic layer to a substrate, comprising:
providing a security thread which consists of
a carrier layer having opposed surfaces,
a first release layer on one of said surfaces,
a second release layer on the other of said surfaces,
a further layer outward of said first release layer, said further layer being said metallic layer, and
an adhesive layer outward of said metallic layer;
bringing said substrate into contact with said adhesive layer and causing the adhesive layer to bond the metallic layer to the substrate, and
peeling the carrier layer away, so that it separates from the metallic layer at said first release layer.

Finally, this invention provides an apparatus for securing a metallic layer to a substrate, the metallic layer being part of a security thread which includes:
a carrier layer having opposed surfaces,
a first release layer on one of said surfaces,
a second release layer on the other of said surfaces,
a further layer outward of said first release layer, said further layer being said metallic layer, and
an adhesive layer outward of said metallic layer;
the apparatus comprising:
means for bringing said substrate into contact with said adhesive layer in order to cause the adhesive layer to bond the metallic layer to the substrate, and
means for peeling the carrier layer away, so that it separates from the metallic layer at said first release layer.

GENERAL DESCRIPTION OF THE DRAWINGS

Figure 2:
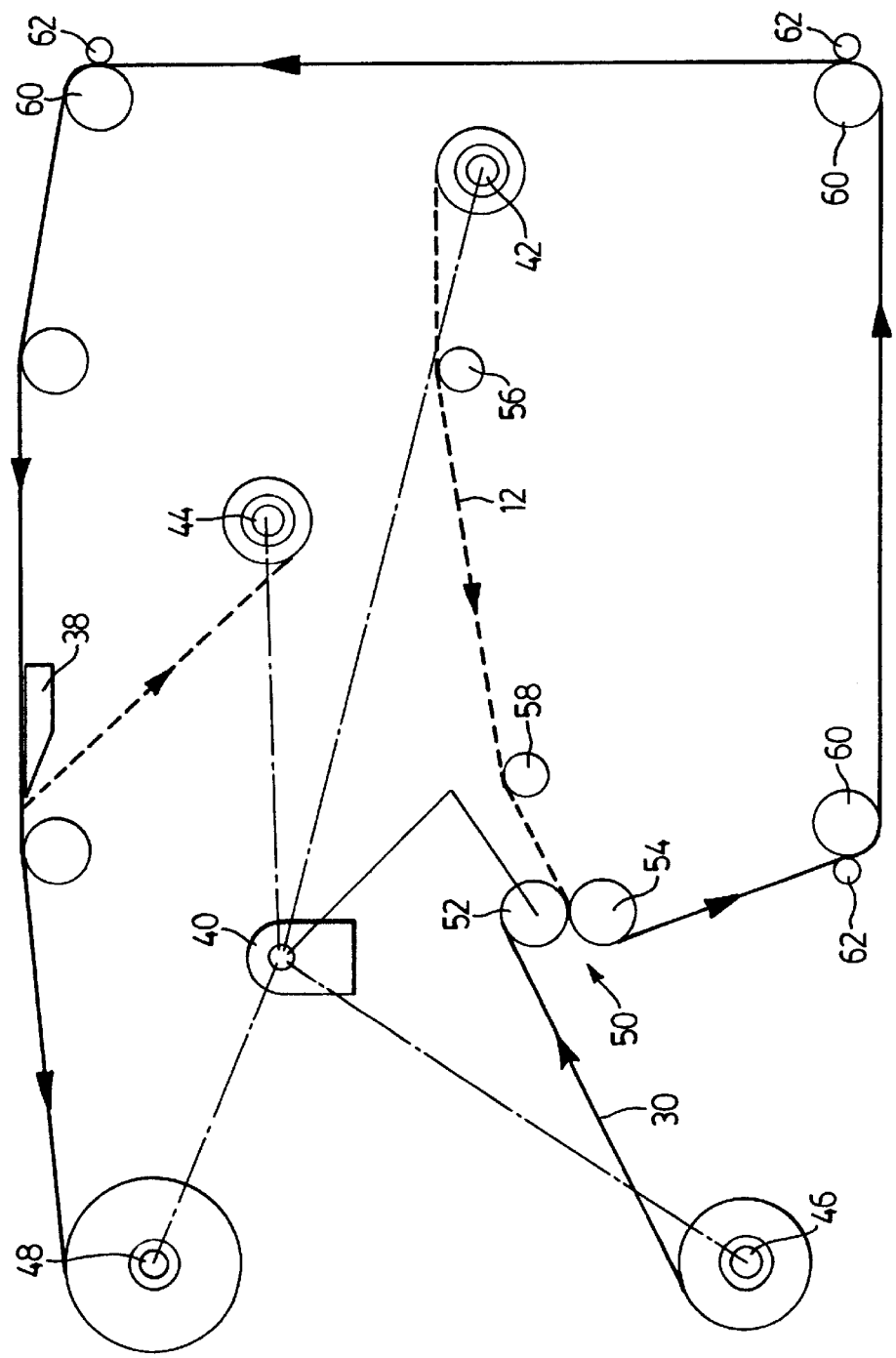

One embodiment of this invention is illustrated in the accompanying drawings, in which like numerals denote like parts in the various figures, and in which:

FIG. 1 is a part elevation, part longitudinal section, somewhat schematically drawn, illustrating the thread of the present invention and its application to a substrate; and FIG. 2 is a schematic view of the apparatus of this invention, illustrating the application of a metallic layer to a substrate.

DETAILED DESCRIPTION OF THE DRAWINGS

Attention is directed first to FIG. 1 which shows in section a cylindrical mandrel 10 on which is wound a thread 12, which is a composite structure incorporating a PET carrier layer 14 as the main supporting layer. Typically, the carrier layer 14 is from about 8 to about 36 microns in thickness, and between about 1.5 and about 25 mm in width. The PET carrier layer 14 has an upper surface 16 and a lower surface 18, it being understood that "upper" and "lower" are relative terms, and are being used here merely for convenience of description. A first release layer 20, which may be an acrylic coating, is applied against the upper surface 16 of the PET carrier layer, and a thin metallic layer 22 is applied to the outside of the release layer 20. The thin metallic layer 22 functions as the security device, and may take one of several forms. Examples are: an optical interference filter, a diffraction grating, a hologram and a plain metallic film. The outer surface 24 of the metallic film 22 is coated with a pressure-sensitive adhesive layer 26. As illustrated in FIG. 1, when the adhesive side of the thread (the upper side in FIG. 1) is brought into contact with the substrate, identified by the numeral 30 in FIG. 1, the application of pressure causes an adhesive bond to be formed securing the metallic layer 22 to the substrate 30.

As illustrated at the right in FIG. 1, when the PET carrier layer 14 is pulled away from the substrate 30, the thin metallic layer 22 separates from the PET carrier layer 14 due to the upper release layer 20. The material of the layer 20 is selected so as not to require the application of heat, only pressure. This is represented schematically in FIG. 1 by the arrows 32.

The total thickness added to the substrate 30, including the adhesive layer 26, is approximately 3 to 5 microns.

In the preferred embodiment, a silicon release layer 34 is coated onto the lower surface 18 of the PET carrier layer 14, so as to prevent the pressure sensitive adhesive layer 26 from adhering to an adjacent convolution of the thread when it is wound in a roll (see the leftward portion of FIG. 1).

At the right in FIG. 1, the numeral 38 designates schematically a knife edge which assists in the separation of the metallic layer 22 from the PET carrier layer 14.

Attention is now directed to FIG. 2 which illustrates an apparatus in the form of a transport system for the substrate and the thread, but mechanically modified to cause the metallic layer of the thread to transfer onto the substrate.

A drive motor shown schematically at 40 is configured to drive, via a single timing belt and slip clutches on the individual components, a thread unwind mandrel 42 adapted to receive the thread roll at the beginning of an operation, a thread rewind mandrel 44, a substrate unwind mandrel 46 adapted to received the substrate roll at the beginning of an operation, and a substrate rewind mandrel 48. The substrate rewind mandrel 48 and the thread rewind mandrel 44 are forward driven, whereas the substrate unwind mandrel 46 and the thread unwind mandrel 42 are reverse driven. The slip clutches (represented in FIG. 2 by the dot-dash character of the power transmitting lines connecting the power source 40 with the various mandrels) are used as a cost-effective way to drive both the substrate and the thread, while maintaining constant tension.

FIG. 2 also illustrates a nip drive 50 which does not have a slip clutch, but rather is directly driven by a timing belt associated with the drive motor 40. This direct drive is indicated in FIG. 2 by the solid line connecting the motor 40 to the nip drive 50.

From the unwind mandrel 46 at lower left in FIG. 2, the substrate is drawn into the nip drive 50, where it passes over and around a first nip roller 52, thence around a portion of the periphery of a second roller 54, as it passes through the nip between the rollers 52 and 54. At the same time, the thread 12 is drawn from the thread mandrel 42, guided by rollers 56 and 58, and passing into the nip between the rollers 52 and 54 such that the pressure-sensitive adhesive layer 26 of the thread comes into contact with the substrate 30. The force with which the nip rollers 52 and 54 are urged together constitutes a first stage of application of pressure between the thread and the substrate, intended to form a good bond between the pressure-sensitive adhesive layer 26 and the substrate 30.

The combined substrate and thread then pass around a plurality of idler rollers 60, each having a spring-loaded nip roller 62 riding on its surface. The spring-loaded nip rollers 62 provide direct pressure on the thread, thus strengthening the bond. As indicated, this direct pressure is provided at three locations on a rather long web path. One reason for this is to increase the thread contact time, defined as the period between when the thread 12 first contacts the substrate 30 and when the PET carrier layer 14 is removed. The other reason is to provide positive pressure to ensure that the pressure-sensitive adhesive layer 26 wets-out and bonds to the substrate 30. With the thread securely bonded to the substrate as it passes over the knife edge 38, the metallic film will split away at the release layer 20 (FIG. 1). The PET carrier layer 14 is then wound onto the thread rewind mandrel 44 as waste. The quality of the transfer depends upon the radius of the leading edge of the knife, the material used for the knife edge, and the angle of peel for the thread carrier. At this point, only the metallized film and the adhesive remain on the substrate. The substrate is finally wound on the substrate rewind mandrel 48, with the transferred metallic layer secured to its surface.

While one embodiment of this invention has been illustrated in the accompanying drawings and described hereinabove, it will be evident to those skilled in the art that changes and modifications may be made therein, without departing from the framework of this invention, as set forth in the appended claims.

The embodiments of the invention in which an exclusive property or privilege is claimed are defined as follows:

1. A method of securing a metallic layer to a banknote, comprising:
   (a) providing a security thread which consists of a carrier layer having opposed surfaces,
      a first release layer on one of said surfaces,
      a second release layer on the other of said surfaces,
      a further layer on said first release layer, said further layer being said metallic layer, and
      a pressure-sensitive adhesive layer on said metallic layer;
   (b) bringing said substrate into contact with said adhesive layer and causing the adhesive layer to bond the metallic layer to the banknote, and
   (c) peeling the carrier layer away, so that it separates from the metallic layer at said first release layer.

2. The method claimed in claim 1, in which the step of bringing the banknote into contact with the adhesive layer is followed by a step of applying compressive pressure to ensure good bonding of the metallic layer to the banknote.

3. The method claimed in claim 1, in which the fit release layer is an acrylic coating while the second release layer is of silicone, in which the metallic layer is selected from the group consisting of: a diffraction grating, an optical interference filter, a hologram and a plain metallic film.

4. The method claimed in claim 1, in which the carrier layer is a PET layer between about 8 and about 36 microns in thickness, in which the thread is between about 1.5 and about 25 mm in width, and in which the metallic layer and the adhesive layer have a combined thickness between about 3 and about 5 microns.

5. The method claimed in claim 3, in which the PET carrier layer is between about 8 and about 36 microns in thickness, in which the thread is between about 1.5 and about 25 mm in width, and in which the metallic layer and the adhesive layer have a combined thickness between about 3 and about 5 microns.

* * * * *